(12) United States Patent
Mizukoshi

(10) Patent No.: US 7,012,202 B2
(45) Date of Patent: Mar. 14, 2006

(54) SWITCH CASE MOUNTING STRUCTURE

(75) Inventor: Takeo Mizukoshi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/193,701

(22) Filed: Jul. 29, 2005

(65) Prior Publication Data

US 2006/0021863 A1    Feb. 2, 2006

(30) Foreign Application Priority Data

Aug. 2, 2004 (JP) .............................. 2004-226066

(51) Int. Cl.
*H01H 9/00* (2006.01)
(52) U.S. Cl. ............................... 200/61.54; 200/61.55; 200/61.56; 280/731
(58) Field of Classification Search .. 200/61.54–61.57, 200/293, 293.1; 280/728.2, 731
See application file for complete search history.

(56) References Cited

U.S. PATENT DOCUMENTS

| 6,437,265 B1 * | 8/2002 | Kreuzer .................... 200/61.54 |
| 6,453,769 B1 * | 9/2002 | Sakurai ........................ 74/552 |
| 6,624,365 B1 * | 9/2003 | Miyako et al. .......... 200/61.54 |
| 6,626,458 B1 * | 9/2003 | Fujita et al. ................ 280/731 |
| 6,852,936 B1 * | 2/2005 | Hayashi et al. .......... 200/61.54 |
| 6,941,836 B1 * | 9/2005 | Umemura et al. ....... 200/61.54 |

FOREIGN PATENT DOCUMENTS

JP        2002-120730        4/2002

* cited by examiner

*Primary Examiner*—Michael A. Friedhofer
(74) *Attorney, Agent, or Firm*—Rankin, Hill, Porter & Clark LLP

(57) ABSTRACT

A structure for mounting a switch case, having at least one press button, to a steering wheel. The switch case has two arms extending therefrom in vertically and circumferentially spaced relation to each other. One arm is attached to an attaching part formed on a hub of the steering wheel, while the other arm abuts on one of spokes of the steering wheel.

3 Claims, 4 Drawing Sheets

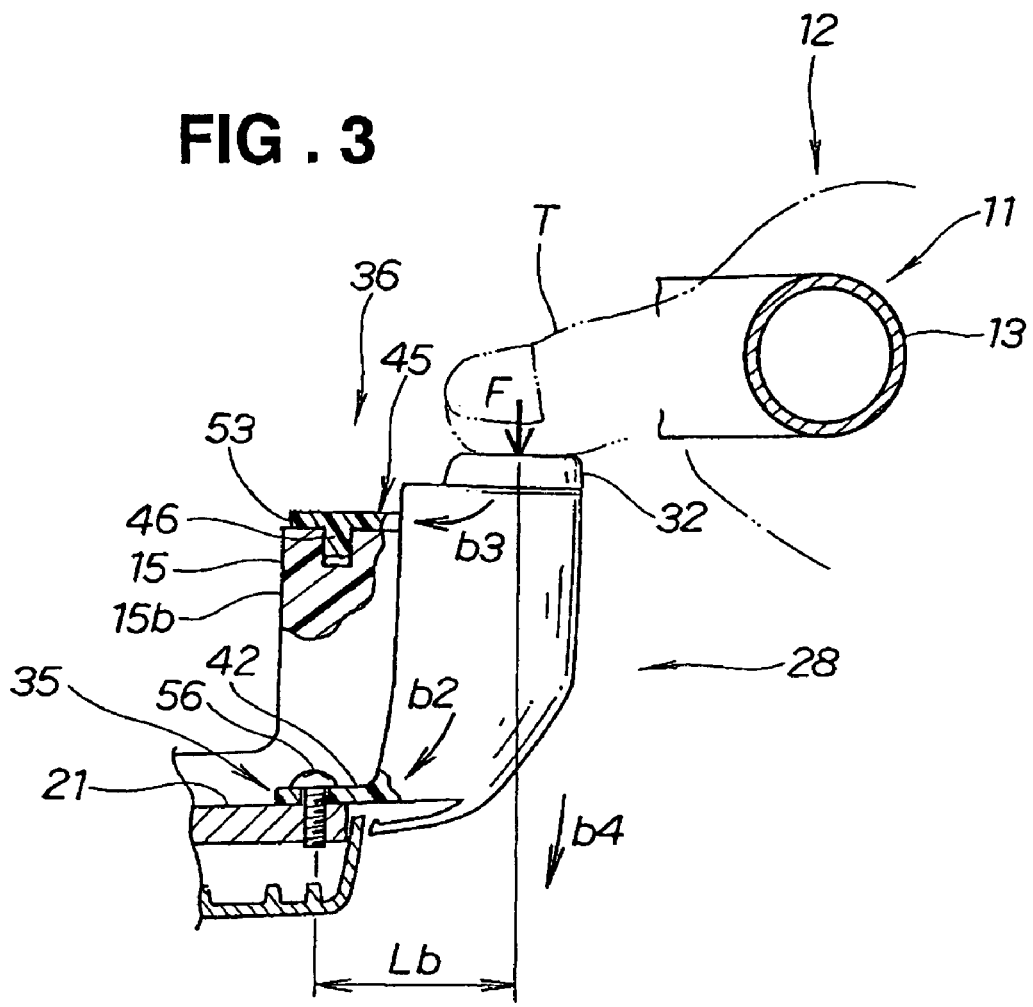

SWITCH CASE MOUNTING STRUCTURE

FIELD OF THE INVENTION

The present invention relates to a structure for mounting a switch case to a steering wheel of a vehicle.

BACKGROUND OF THE INVENTION

In recent years, a switch is mounted to a vehicle steering wheel for operating vehicle equipment such as an audio system, a telephone, an air conditioner and a navigation system. An example mounting structure for such a switch is disclosed in Japanese Patent Laid-Open Publication No. 2002-120730, which will be described with reference to FIG. 4A and FIG. 4B hereof.

As shown in FIGS. 4A and 4B, the conventional switch mounting structure is arranged such that a switch assembly 101 is press-fitted with a leg piece 103 formed on a metal bracket 102, as shown by arrow a1. This arrangement requires no fastenings such as screws or bolts and thus facilitates the required mounting process.

In the above structure, however, the leg piece 103 is liable to be bent in the direction of arrow a3 when the switch assembly 101 is pressed in the direction of arrow a2. Particularly, when the switch assembly 101 is pressed with a finger of a driver's hand holding a steering wheel, it is likely that an end 104 of the switch assembly 101 is pressed, causing the leg piece 103 to be more easily bent.

It is thus desired to prevent the bending of a steering wheel switch by a pressing force applied to a press button of the switch.

SUMMARY OF THE INVENTION

According to the present invention, there is provided a switch case mounting structure comprising: a steering wheel having a rim, a hub provided inside the rim, and a plurality of spokes connecting the rim and the hub; and a switch case to be mounted to the steering wheel and having at least one press button, wherein the switch case has two arms extending therefrom in spaced relation to each other, one of the arms being attached to an attaching part formed on the hub, the other arm abutting on one of the spokes.

This arrangement prevents bending of the switch case by a pressing force applied to the press button of the switch.

The other arm preferably has a part which is L-shaped in cross section.

A load arising from pressing the press button is born by a mounting portion of the switch case which is offset from a point of press operation on the switch box.

BRIEF DESCRIPTION OF THE DRAWINGS

A preferred embodiment of the present invention will be described in detail below, by way of example only, with reference to the accompanying drawings, in which:

FIG. 2A is a perspective view showing a mounting state of a right press button switch of FIG. 1 relative to the steering wheel, while FIG. 2B is a cross-sectional view taken along line 2B—2B of FIG. 1;

FIG. 3 illustrates how a pressing force is applied to the right press button switch when a press button of FIG. 2A is pressed; and FIG. 4A

DETAILED DESCRIPTION OF THE PREFERRED EMBODIMENT

Figure 1:
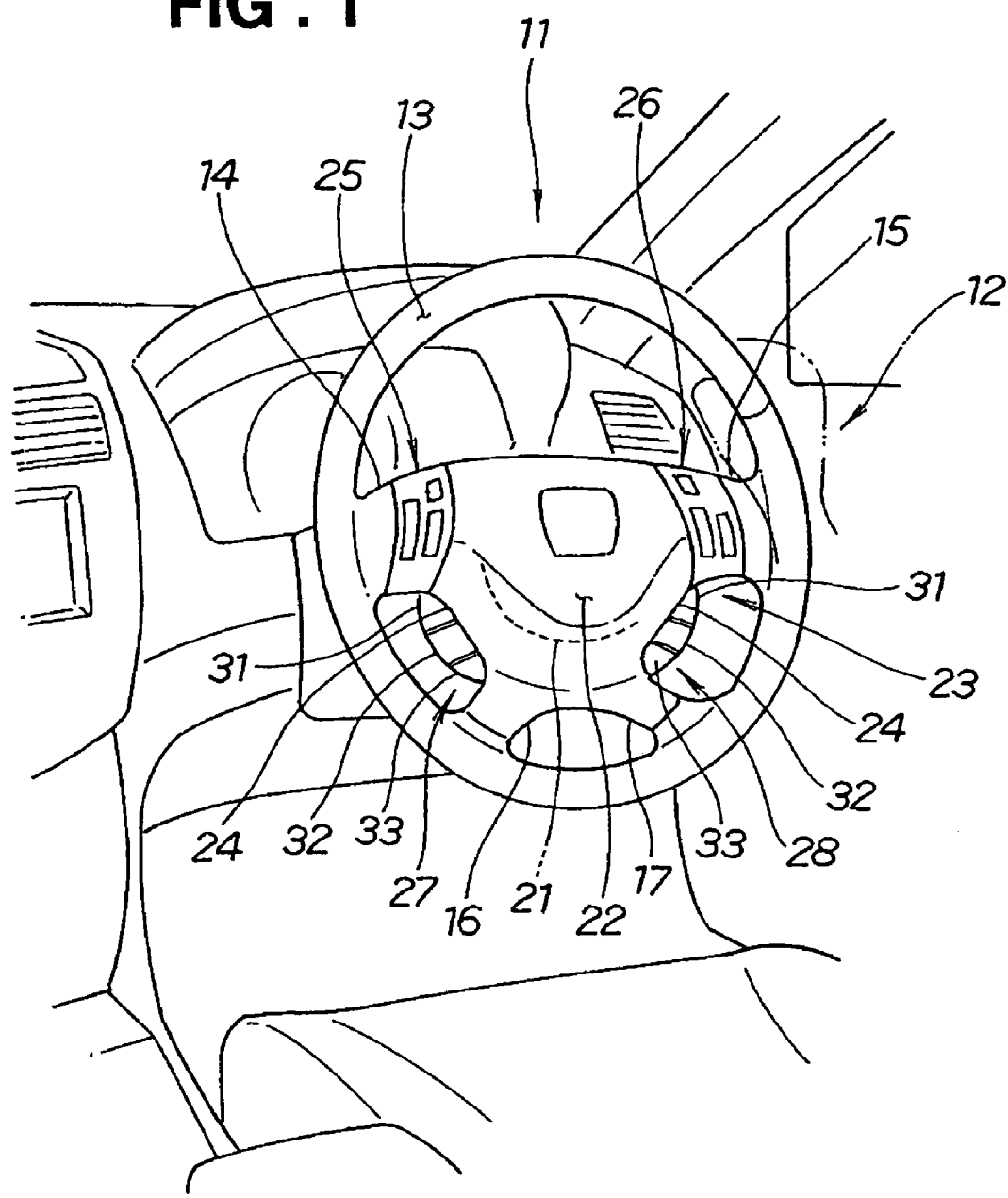
FIG. 1 is a perspective view of a steering wheel to which a switch case is mounted according to the present invention.

As shown in FIG. 1, a steering wheel 11 includes a circular rim 13 to be held by hands of an operator or driver 12, a hub 21 provided inside the rim 13, first through fourth spokes 14–17 each connecting the rim 13 and the hub 21, and a cover member 22 attached to the hub 21. An operating switch device 23 is mounted to mount portions 24, 24 provided on the steering wheel 11.

The operating switch device 23 is provided for radio control, air conditioner control, cruise control and shift control, for example. The operating switch device 23 includes a first switch means 25 disposed on the first spoke 14, a second switch means 26 disposed on the second spoke 15, a left press button switch 27 provided between the first and third spokes 14, 16, and a right press button switch 28 provided between the second and fourth spokes 15, 17.

The right and left press button switches 28, 27 are provided on the mount portions 24, 24. The right and left press button switches 28, 27 have approximately the same structure, except that the right press button switch 28 is for operation by a right hand while the left press button switch 27 is for operation by a left hand. Reference numeral 31 denotes a first press button, 32 a second press button disposed next to the first press button 31, and 33 a third press button disposed next to the second press button 32.

Next, the right press button switch 28 will be described with reference to FIG. 2A and FIG. 2B. Since the left press button switch 27 is similar in structure to the right press button switch 28, only the right press button switch 28 will be described.

Figures 2A, 2B:
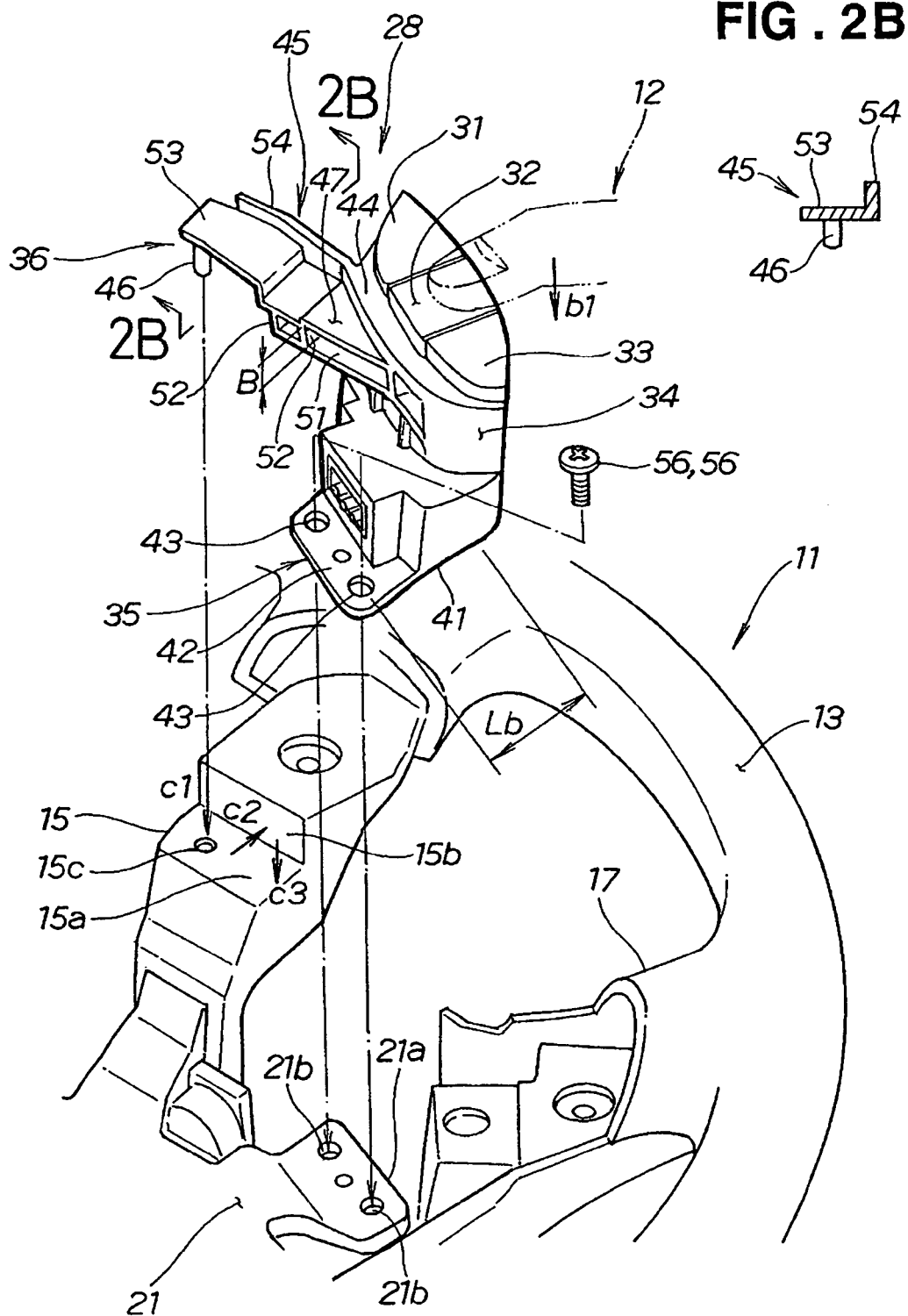
Figure 4A:
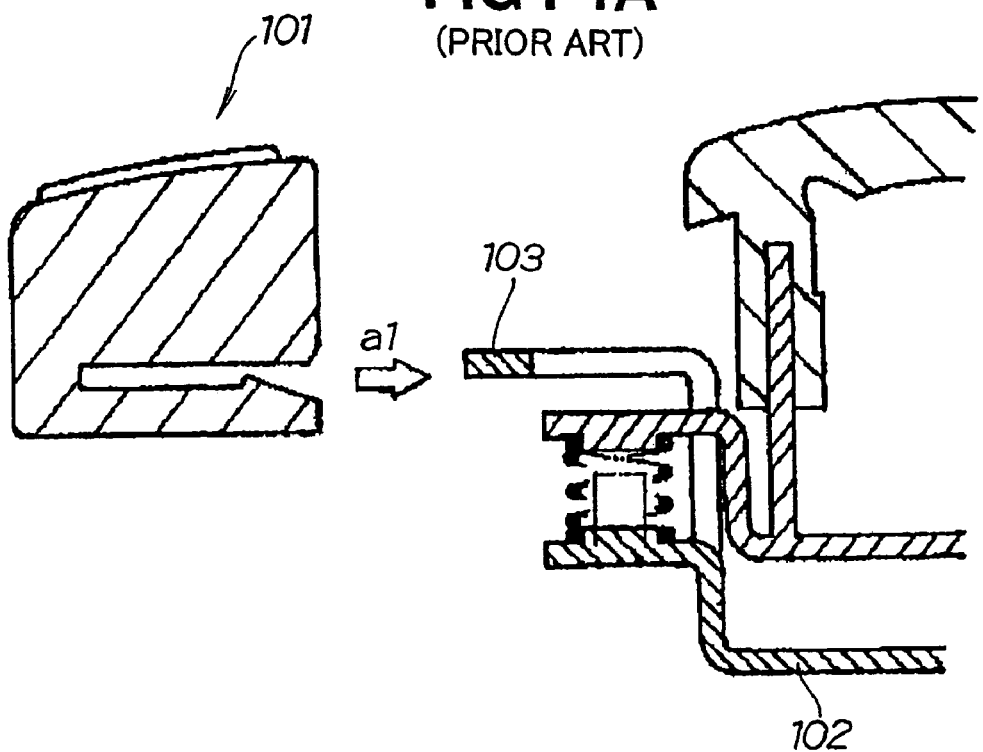
FIG. 4B is a cross sectional view showing a conventional steering wheel switch mounting structure.
Figure 4B:
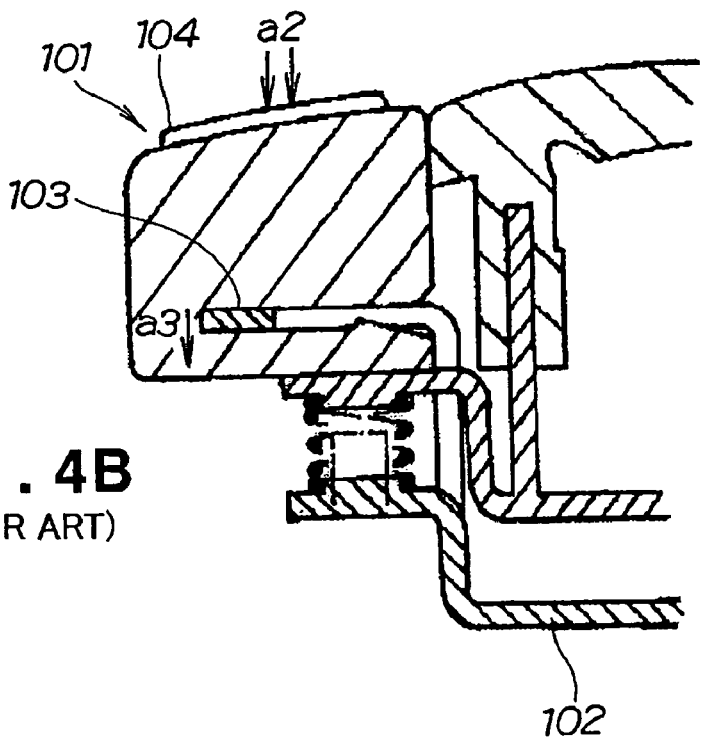

Referring now to FIG. 2A, the right press button switch 28 includes the first press button 31, second press button 32, third press button 33, and a switch case 34. The first through third press buttons 31–33 are pressed with fingers of the operator 12. The first through third press buttons 31–33 are retained in the switch case 34 such that they can be depressed in the direction of arrow b1. The switch case 34 protects first through third switch parts (not shown) that acts independently by depressing the first through third press buttons 31–33. Two arms 35, 36 are vertically spaced from each other and extend from the switch case 34 toward the hub 21. One arm 35 is attached to an attaching part 21a formed on the hub 21. The other arm 36 is anchored to the second spoke 15.

The one arm 35 has a lower mounting portion 42 in the form of a plate provided at a lower or bottom part 41 of the switch case 34. The lower mounting portion 42 horizontally projects by a distance Lb from mid-parts of the first through third press buttons 31–33. The lower mounting portion 42 has a plurality of openings 43.

The other arm 36 has an upper mounting portion 45 provided at a top 44 of the switch case 34. The upper mounting portion 45 is L-shaped in cross section, as shown in FIG. 2B. The upper mounting portion 45 has a positioning pin 46 extending downwardly from a distal end thereof.

More specifically, the upper mounting portion 45 includes an upper plate 47 formed integrally with the switch case 34, a lower plate 51 formed integrally with the switch case 34 and positioned a predetermined distance B away from the upper plate 47, ribs 52, 52 connecting the upper and lower plates 47, 51, a press part 53 extending continuously from the upper plate 47, a positioning pin 46 provided on an undersurface of the pressing part 53, and a plate member 54 formed integrally with the pressing part 53, upper plate 47 and switch case 34 and extending vertically.

The second spoke 15 is made of a polyurethane material The second spoke 15 includes a centrally formed switch case receiving portion 15a, a switch case supporting portion 15b, and an insertion hole 15c formed in the case receiving portion 15a for allowing insertion of the positioning pin 46.

Discussion will be made next as to a mode of attaching the switch case 34 to the steering wheel 11.

First, the positioning pin 46 of the lower arm 36 is inserted into the hole 15c of the switch case receiving portion 15a, as shown by arrow c1, until the pressing part 53 of the arm 36 abuts against the switch case receiving portion 15a to thereby properly position the switch case 34. At this time, the lower mounting portion 42 of the arm 35 is placed on the attaching part 21a of the metal hub 21 of the steering wheel 11 such that the openings 43, 43 formed on the lower mounting portion 42 are aligned with respective screw holes 21b, 21b. Then, screws 56, 56 are inserted through the openings 43, 43 and threadedly engaged in the screw holes 21b, 21b to thereby attach the switch case 34 to the steering wheel 11.

The witch case of the left press button switch 27 (see FIG. 1) may be mounted to the steering wheel 11 similarly to the switch case 34 of the right press button switch 28.

Reference is made next to FIG. 3 showing how a pressing force arising from operating the right press button switch 28 acts on various parts.

When the second press button 32 of the right press button switch 28 is depressed with a force F from a finger T of the operator 12, the force F is distributed in the directions of arrows b2, b3 by virtue of the arms 35, 36 (lower and upper mounting portions 42, 45). As a result, the force or stress generated in the arm 35 (lower mounting portion 42) becomes smaller than in the case in which the right press button switch 28 is supported by the arm 35 (lower mounting portion 42) alone, thereby preventing bending of the right press button switch 28 in the direction of arrow b4 by the force F from pressing the right press button switch 28.

By making the plate member 54 of the arm 36 abut against the supporting portion 15b of the second spoke 15, as shown in FIG. 2A, the arm 36 is inhibited from moving in the direction of arrow c2 upon application of the force F as shown in FIG. 3. As a result, the right press button switch 28 is prevented from bending in the direction of arrow b4 shown in FIG. 3.

The pressing part 53 of the arm 36 abuts against the receiving portion 15a of the second spoke 15, as described above. As a result, when applied with the force F (see FIG. 3), the pressing part 53 presses the second spoke 15 in the direction of arrow c3 to thereby restrict movement of the arm 36 in the direction of arrow c2.

As shown in FIG. 2A, in the switch case mounting structure for the switch case 34 (right press button switch 28), the arm 36 (upper mounting portion 45) is formed into an L-shape in cross section, it has increased strength (section modulus) against the force F, thereby preventing the bending of the right press button switch 28 in the direction of arrow b4 (FIG. 3).

In the switch case mounting structure (right press button switch 28), the arm 36 (upper mounting portion 45) has the upper plate 47, the lower plate 51 provided a given distance B away from the upper plate 47 and the ribs 52, 52 formed between the upper and lower plates 47, 51. As a result, it becomes possible to prevent the bending of the steering wheel switch (right press button switch) 28 in the direction of the arrow b4 without an increase in weight.

It will be readily appreciated by a skilled artisan that the switch case mounting structure of the present invention may be applied to four-wheeled vehicles as well as to three-wheeled vehicles.

Obviously, various minor changes and modifications of the present invention are possible in the light of the above teaching. It is therefore to be understood that within the scope of the appended claims the invention may be practiced otherwise than as specifically described.

What is claimed is:

1. A switch case mounting structure comprising:
a steering wheel having a rim, a hub provided inside the rim, and a plurality of spokes connecting the rim and the hub; and
a switch case mounted to the steering wheel and having at least one press button,
wherein the switch case has two arms extending therefrom in spaced relation to each other, one arm being attached to an attaching part formed on the hub, the other arm abutting against one of the spokes.

2. A mounting structure as set forth in claim 1, wherein the other arm has an L-shaped part in cross section.

3. A mounting structure as set forth in claim 1, wherein a load arising from pressing the press button is born by a mounting portion of the switch case which is offset from a point of press operation on the switch box.

* * * * *